Feb. 26, 1957 M. E. HAMILTON 2,783,103
AGRICULTURAL DISC MOUNTING
Filed May 3, 1954
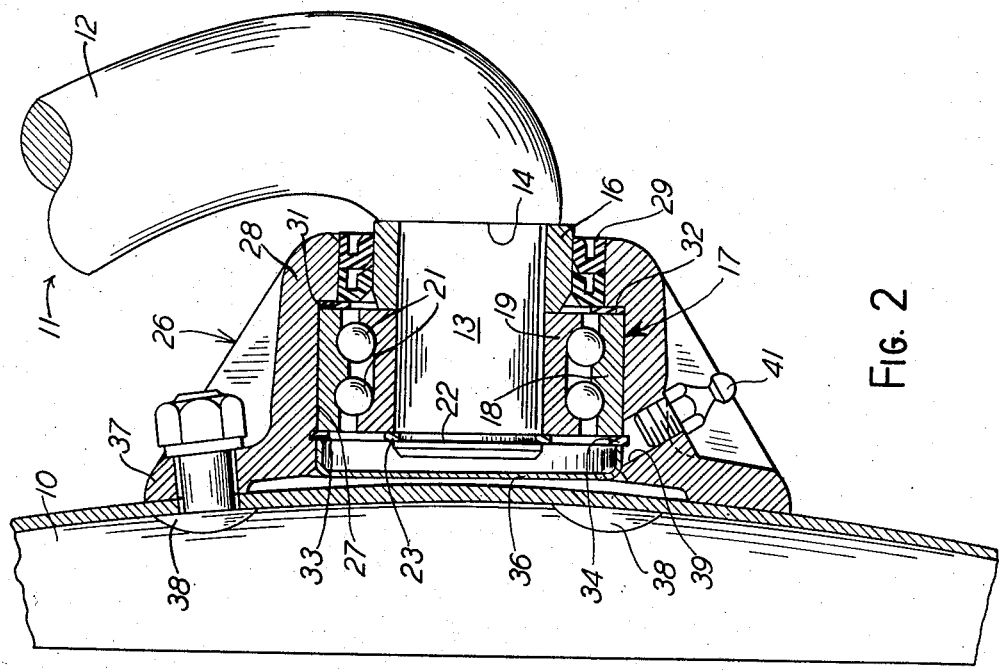
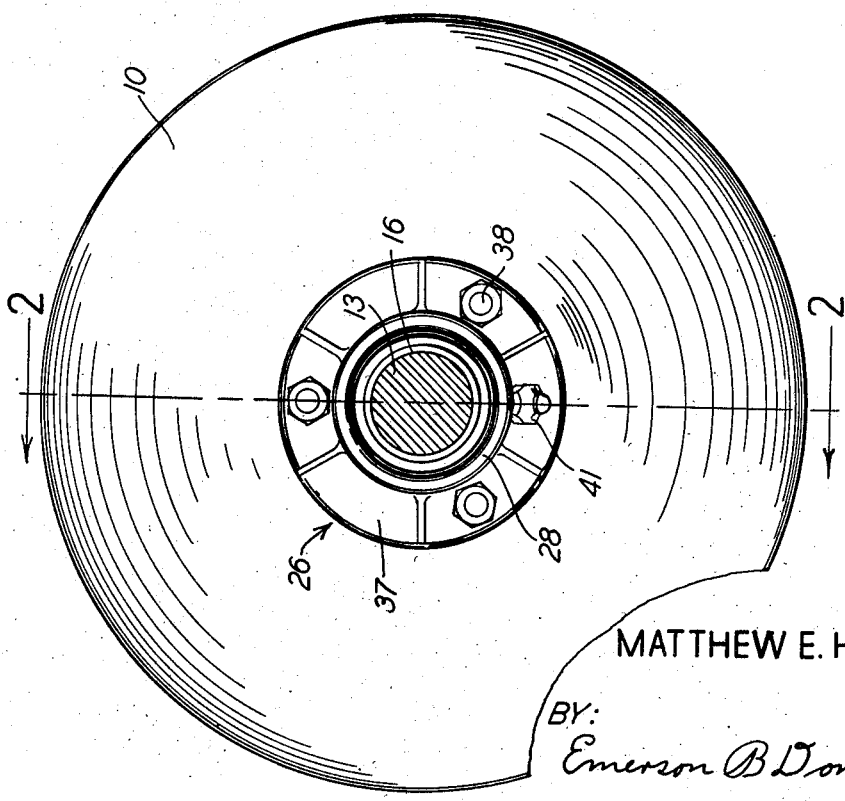
INVENTOR
MATTHEW E. HAMILTON
BY:
Emerson B Donnell
ATTORNEY United States Patent Office 2,783,103
Patented Feb. 26, 1957

2,783,103

AGRICULTURAL DISC MOUNTING

Matthew E. Hamilton, Stockton, Calif., assignor to J. I. Case Company, Racine, Wis., a corporation of Wisconsin Application May 3, 1954, Serial No. 427,017

3 Claims. (Cl. 308—181)

This invention pertains to anti-friction bearing constructions, and, more particularly, it pertains to an anti-friction bearing mounting for an agricultural disc hiller.

It is an object of this invention to provide a disc hiller anti-friction bearing mounting which is simple and inexpensive to manufacture but highly efficient in operation.

Another object is to provide a disc hiller bearing mounting which is substantially dirt- and dustproof even when the disc is operating in soil.

Other objects and advantages will become apparent upon reading the following description in conjunction with the accompanying drawings, in which, Fig. 1 is a side view of a disc hiller containing a preferred embodiment of this invention.

Fig. 2 is an enlarged fragmentary sectional view taken on the line 2—2 of Fig. 1.

Similar reference numerals refer to similar parts between the two views.

At the outset it should be understood that this invention is applicable to an agricultural disc hiller which is usually supported to depend from a tractor to engage the ground for the purpose of cultivating or the like. Therefore, the drawings show a disc 10 rotatably mounted on an axle 11 which has an upper vertical end 12 and a lower substantially horizontal end 13. The axle upper end is usually clamped in any conventional manner to a tractor mounting while the axle lower end is disposed to rotatably mount the disc 10 transverse to the axle end 13 in a manner hereinafter described. It should be noted that the disc 10 is dished to present a convex side adjacent the axle end thereof. However, the mounting of the disc could instead obviously be on the concave side thereof with obvious changes in certain parts of the embodiment shown.

In the preferred embodiment of rotatably mounting the disc 10 onto the axle 11, the axle lower end 13 is provided with a shoulder 14. A ring sleeve or collar or sleeve 16 is snugly positioned over the axle end 13 to abut the shoulder 14. A generally conventional assembly of an anti-friction ball bearing 17 is mounted over the outer end of the axle end 13. The ball bearing assembly 17 consists of an outer race 18 and an inner race 19 with the usual intermediate balls 21. In the embodiment shown, there is provided a double row of balls 21 to insure stability and satisfactory wearing life of the ball bearing. One side of the inner race 19 abuts the side of the collar 16 to locate and maintain the bearing on the axle. The outer end of the axle end 13 contains an annular groove 22, located adjacent the outer end of the inner race 19, to receive a snap ring 23 which secures the ball bearing 17 onto the axle 11.

A hub or flanged ring 26 contains an inner circular bore or wall 27 which fits snugly over the outer circumference of the ball bearing outer race 18. An end 28 of the hub 26 is inwardly flanged to form an annular space with the collar 16 in which space a grease seal member 29 of the one-way type is retained. In the construction shown, the grease seal member is a double cup-shaped synthetic type of radially expansible seal. The seal 29 is, therefore, designed for sealing in radial directions and it can be compressed radially as the opposite sides of the cup shape move together to cause a tighter seal. Further, the seal 29 allows grease to pass from the bearing but it is self-sealing if dirt attempts to enter the bearing past the seal. Also, an annular shoulder 31 exists on the hub 26 between the inner wall 27 and the flanged end 28 to abut a washer 32 which is positioned between the shoulder 31 and a side of the ball bearing outer race 18. It should be observed that the bearing side of the washer 32 is aligned with the end of the collar 16 which abuts the inner race 19.

The opposite end of the hub 26 contains an annular groove 33 in the circular wall 27 at a plane coincident with the end of the ball bearing 17 and aligned with the axle groove 22. A conventional type of snap ring 34 is loosely disposed within the groove 33 to abut and retain the outer race of the ball bearing. With this construction it should be apparent that the ball bearing 17 is securely mounted onto the axle 11 and within the hub 26.

A dustproof grease retainer cup 36 is positioned inside the hub wall 27 to abut the snap ring 34 and thereby seal that end of the bearing structure. The outer flanged edge of the cup 36 bears against the wall 27 to effect a seal therebetween.

The end 37 of the hub 26 adjacent the disc 10 is flanged outwardly to provide a concave bearing surface which conforms to the convex curvature of the disc. A plurality of bolts 38 pass through the flange 37 and the disc 10 to secure the latter to the hub and the axle. Reinforcing ribs are formed on the hub to be radially disposed and circumferentially spaced therearound as shown in Fig. 1.

It is preferred that a grease passage 39 be provided through a wall of the hub 26 to the interior thereof with a grease fitting 41 closing the exterior of the passage. In this construction, grease can be introduced between the inner and outer races of the ball bearing 17 by passing the snap ring 34 which is loosely fitted in the groove 33.

It will thus be appreciated that an effective but inexpensive anti-friction bearing mounting is provided for a disc hiller. The construction does not require the usual machined parts in a bearing mounting of a similar type wherein alignment and stability are essential. The scope of this invention should be limited only by the appended claims.

I claim:

1. In a bearing assembly for a disc tillage implement, the combination of an axle, a cylindrical bearing portion on said axle providing an outwardly directed shoulder and a groove adjacent the end of said bearing portion distal from said shoulder, a sleeve on said bearing portion adjacent said shoulder, an anti-friction bearing on said portion between said sleeve and said groove, a snap ring in said groove and extending outwardly therefrom in position to prevent substantial axial shifting of said bearing relative to said axle in one direction, a hub disposed about said anti-friction bearing and having a bore therethrough within which said bearing fits in hub supporting relation, said bore being radially spaced from said sleeve and providing a reentrant shoulder adjacent said sleeve and engaged with said bearing for preventing axial movement of said hub relative to said bearing in one direction and said bore providing a groove distal from said shoulder, a snap ring in said groove and extending into said bore in position to prevent axial movement of said hub relative to said bearing in the other direction, grease sealing means interposed in the radial space between said sleeve and said bore, with said means and said sleeve and said axle all closing one end of said bore, a grease receiving fitting on said hub communicating with said bore in the region of said snap rings, and a tillage disc anchored to and rotatable with said hub, and closing the other end of said bore.

2. In an agricultural disc mounting, the combination comprising an axle having an outer end and a shoulder spaced from said outer end, a ball bearing mounted on said axle to be limited in axially inward movement by said shoulder, a retainer mounted on said outer end of said axle for limiting said ball bearing in axially outward movement, a one-piece hub snugly mounted over said ball bearing and having a bore concentric to said axle and extending in an axially inner end and an axially outer end beyond the respective axial ends of said ball bearing in radially spaced relation to said axle, a radially inward shoulder formed on said hub for engagement with the axially inner end of said ball bearing for limiting axially outward movement of said hub with respect to said bearing, a retainer engaging said hub and the axially outer end of said ball bearing for limiting axially inward movement of said hub with respect to said bearing, a radially expansible type of grease seal disposed in said axially inner end of said bore for sealing therewith to prevent the entrance of dirt to said ball bearing past said axially inner end of said bore, a grease cup disposed in said axially outer end of said bore for sealing therewith to prevent entrance of dirt to said ball bearing past said axially outer end of said bore, said hub having a grease passage therethrough and in direct communication with said bore at a location between said grease seal and said grease cup and nearer the latter, and a soil working disc attached to said hub.

3. In an agricultural disc anti-friction mounting, the combination comprising a non-rotatably mounted axle, an inner race and an outer race of a ball bearing mounted on said axle, a double row of ball bearings disposed between said inner race and said outer race, a retainer on said axle at each end of said inner race for axially securing the latter to said axle, a hub having a bore for snugly mounting said hub on said outer race for rotation therewith and including a shoulder disposed adjacent one end of said outer race for securing said hub against axial movement relative to said outer race and in one axial direction, said bore of said hub having an annular groove in a plane aligned with the other end of said outer race, a snap ring disposed in said groove for securing said hub against axial movement relative to said outer race and in the other axial direction, said snap ring being axially loose in said groove for the radial passage of grease past said ring and through said groove, a one-way grease seal disposed at said one end of said outer race for permitting grease to flow past said one-way seal in a direction away from said bearing, a dust-proof grease seal disposed spaced beyond said other end of said outer race, said hub having a grease passage in direct communication with said annular groove for forcing grease under pressure past said snap ring and between said grease seals onto said ball bearings, and a soil tilling disc attached to said hub to rotate therewith.

References Cited in the file of this patent
UNITED STATES PATENTS

| | | |
|---|---|---|
| 2,105,120 | Johnson | Jan. 11, 1938 |
| 2,136,155 | Spicacci | Nov. 8, 1938 |
| 2,596,643 | Boyett | May 13, 1952 |
| 2,597,524 | Birt | May 20, 1952 |

FOREIGN PATENTS

| | | |
|---|---|---|
| 73,558 | Norway | May 31, 1928 |